United States Patent
Satoh et al.

[11] Patent Number: 5,899,118
[45] Date of Patent: May 4, 1999

[54] STEERING WHEEL AND METHOD OF MANUFACTURE

[75] Inventors: Kazuyuki Satoh, Shizuoka-ken; Masanobu Wakita, Tokushima-ken; Tohru Kaneko, Shizuoka-ken; Naoki Oe, Nagoya; Tsutomu Muraoka, Seto; Keizoh Suzuki, Kani, all of Japan

[73] Assignees: Toho Rayon Co., Ltd., Tokyo, Japan; Kabushiki Kaisha Tokai-Rika-Denki-Seisakusho, Aichi-ken, Japan

[21] Appl. No.: 08/787,635

[22] Filed: Jan. 23, 1997

[30] Foreign Application Priority Data

Jan. 26, 1996 [JP] Japan .................................. 8-32630

[51] Int. Cl.⁶ ........................................................ B62D 1/04
[52] U.S. Cl. ................................................................ 74/552
[58] Field of Search ........................... 74/552, 558, 558.5

[56] References Cited

U.S. PATENT DOCUMENTS

| | | | |
|---|---|---|---|
| 1,212,169 | 1/1917 | Bateholts | 74/552 |
| 2,193,639 | 3/1940 | Mueller | 74/552 |
| 4,419,908 | 12/1983 | Reikowski | 74/552 |
| 4,473,520 | 9/1984 | Overcashier et al. | |
| 4,633,734 | 1/1987 | Yano et al. | 74/552 |
| 4,635,500 | 1/1987 | Overcashier et al. | 74/552 |
| 4,662,238 | 5/1987 | Zeller | 74/552 |
| 4,673,451 | 6/1987 | Yamazawa et al. | |
| 4,788,759 | 12/1988 | Yano et al. | 74/558 X |
| 4,798,101 | 1/1989 | Yamazawa et al. | 74/552 |
| 4,975,235 | 12/1990 | Henigue . | |
| 5,139,714 | 8/1992 | Hettinga . | |
| 5,186,075 | 2/1993 | Kushmaul et al. | 74/552 |
| 5,305,655 | 4/1994 | Kaga | 74/552 |
| 5,354,523 | 10/1994 | Shah . | |

FOREIGN PATENT DOCUMENTS

| | | |
|---|---|---|
| 0 139 015 | 5/1985 | European Pat. Off. . |
| 2 467 758 | 4/1981 | France . |
| 2 665 665 | 2/1992 | France . |
| 59-160666 | 9/1984 | Japan . |
| 6-206548 | 7/1994 | Japan . |
| 1582846 | 1/1981 | United Kingdom ..................... 74/552 |
| 86/05454 | 9/1986 | WIPO . |

*Primary Examiner*—Charles A. Marmor
*Assistant Examiner*—Mary Ann Battista
*Attorney, Agent, or Firm*—Kanesaka & Takeuchi

[57] ABSTRACT

To provide a steering wheel which is lightweight, and which has adequate strength and shock resistance, a carbon fiber prepreg 13 is wound on a mandrel 11 or a lightweight foam core 40 so as to obtain a preformer 14. By heating this preformer 14 in a mold 18, a steering wheel is obtained wherein the rim is formed from a fiber-reinforced synthetic resin joined to a metal skeleton 23.

11 Claims, 14 Drawing Sheets

STEERING WHEEL AND METHOD OF MANUFACTURE

BACKGROUND OF THE INVENTION

1. Field of the Invention

This invention relates to a steering wheel, and to its method of manufacture. In particular, it relates to a steering wheel having a fiber-reinforced synthetic resin rim, a metal center boss and metal spokes.

2. Description of the Related Art

A vehicle is provided with a steering wheel fitted to the upper part of a steering shaft. The driver of the vehicle rotates this steering wheel to activate a steering mechanism which changes the direction of wheels, thereby steering the vehicle.

FIG. 31 shows a framework of a conventional steering wheel. A skeleton 2 of carbon steel or aluminum alloy having a center boss 1 at its center, is first manufactured, and the outer part of this skeleton 2 is then covered by a synthetic resin 3 such as for example polyurethane resin, polypropylene resin or soft PVC resin so as to obtain a steering wheel suitable for steering as shown in FIG. 32. The steering wheel is then connected to a steering shaft by a center hole 4 formed in the center of the center boss 1.

To mitigate shocks and protect passengers, an airbag system is provide effectively in the center of the steering wheel. However, when an airbag system is fitted, its weight adds to that of the steering wheel so that the overall weight of the assembly increases.

In this respect, Japanese patent provisional publication No. 59-160666, for example, proposes a steering wheel having a magnesium alloy skeleton which is lighter than aluminum alloy. However this steering wheel was still not sufficiently lightweight. Other Japanese patent provisional publication No. 6-206548 proposes a steering wheel wherein prepregs and foam sheets are laminated on a skeleton of low melting point alloy and cured to form a cast. Thereafter, the low melting point alloy forming the skeleton was removed by melting. This steering wheel is more lightweight, but it is difficult to manufacture. Further, it is difficult to insert fixing holes in airbag systems, horns and covers.

OBJECTS AND SUMMARY OF THE INVENTION

This invention, which was conceived in view of the above problems, aims to provide a steering wheel which is lightweight, has ample strength and shock absorption capacity, and is easy to manufacture.

Another object of this invention is to provide a steering wheel, the rim of which is made of fiber reinfored hollow circular resin tube firmly jointed to a light weight alloy skelton.

A further object of this invention is to provide a steering wheel, spokes of which deform plastically for absorbing shock energy when impact force is applied.

A still further object of this invention is to provide a steering wheel which has a low moment of inertia and is easy to control and has a "sporty" feel.

A still further object of this invention is to provide a steering wheel which is suitable to mount an airbag system on it.

A still further object of this invention is to provide a steering wheel which requires very little final machining.

A still further object of this invention is to provide a steeling wheel on which an unique texture of reinforcing fiber braid appears on the outer surface causing a high commercial value.

The main invention of this application relates to a steering wheel comprising:

a rim fabricated from a fiber-reinforced synthetic resin, metal center boss having a link portions joined to a steering shaft, and metal spokes joining the rim to the center boss.

The ends of the spokes are firmly joined to the fiber-reinforced synthetic resin rim.

The reinforcing fiber used in the fiber-reinforced synthetic resin of the rim may be carbon fiber, aramid fiber, glass fiber, ultra high molecular weight polyethylene fiber or high strength polyarylate fiber.

The spokes may comprise an aluminum alloy or magnesium alloy.

A counterweight for improving balance may be disposed inside the rim. This counterweight may comprise a metal plate, a solid comprising a resin cured with a metal powder, or metal fibers.

The invention relates also to a process for manufacturing this steering wheel, comprising:

a step for covering a mandrel having an external diameter corresponding to the internal diameter of a rim, by a tube in which internal pressure is to be applied, a step for laminating the mandrel covered by the tube with fiber-reinforced prepregs, and then removing it from the mandrel together with the tube so as to obtain a preformer, a step for pressing and bending this preformer into a cavity of a mold corresponding to a rim of a steering wheel, a step for setting a metal skeleton comprising a center boss and spokes in a one-piece construction, into this steering wheel mold, a step for joining link portions at the ends of the spokes of the skeleton to the preformer by fiber-reinforced prepregs, and a step for clamping the steering wheel mold and heating the preformer, the tube being under internal pressure so as to form the steering wheel.

An invention relating to another method of manufacturing a steering wheel, comprises:

a step for covering a mandrel having an external diameter corresponding to the internal diameter of a rim, by a tube in which internal pressure is to be applied, a step for laminating the mandrel covered by the tube with fiber-reinforced prepregs, and then removing it from the mandrel together with the tube so as to obtain a preformer, a step for injecting an alcohol into the tube of this preformer, and sealing the open end of the tube, a step for pressing and bending the preformer into a cavity of a mold corresponding to a rim of a steering wheel, a step for setting a metal skeleton comprising a center boss and spokes in a one-piece construction, into this steering wheel mold, a step for joining link portions at the ends of the spokes of this skeleton to the preformer by fiber-reinforced prepregs, a step for clamping the steering wheel mold and heating the preformer so as to form the steering wheel, and a step for forming a small hole in the rim of the steering wheel, and heating the rim above the boiling point of the alcohol so as to remove the alcohol.

An invention relating to yet another method of manufacturing a steering wheel, comprises:

a step for injecting a lightweight foam into a mold having the shape remaining after subtracting the thickness of a fiber-reinforced resin of a rim of a steering wheel, and curing it so as to obtain a core, a step for laminating fiber-reinforced prepregs on this core so as to obtain a rim preformer, a step for pressing this preformer into a cavity of a mold corresponding to a rim of a steering wheel, a step for setting a metal skeleton comprising a center boss and spokes in a one-piece construction, into this steering wheel mold, a step for joining link portions at the ends of the spokes of this skeleton to the preformer by fiber-reinforced prepregs, and a step for clamping the steering wheel mold and heating the preformer so as to form the steering wheel.

These inventions therefore provide a steering wheel which is lightweight, has adequate strength and shock absorption capacity, and a method of manufacturing this steering wheel easily.

The resin used in the fiber-reinforced synthetic resin rim of the steering wheel may be an epoxy resin, vinyl ester resin, unsaturated polyester resin, bismaleimide resin, polyimide resin, or a crosslinked polyester amide (CP resin). The fiber used to reinforce this resin may be carbon fiber, glass fiber, aramid fiber, ultra high molecular weight polyethylene fiber or high strength polyarylate fiber, as stated hereabove.

When the metal skeleton, which comprises the center boss and spokes in a one-piece construction, is joined to the rim, the skeleton is preferably protected by a woven prepreg of an insulating material such as glass fiber before making the join with the carbon fiber. This is made in order to prevent galvanic corrosion due to contact between the metal of the skeleton and the carbon fiber.

When carbon fiber is used for the purpose of reinforcing, the orientation of the fibers preferably lies within a range of 10°–90°, and more preferably within a range of 30°–60°, relative to a center line through a section of the rim. This is made in order to cope with the bending stress and twisting stress which act on the rim when a load is applied to it. This is also due to the fact that after the carbon prepreg is wound on straight, it has to be bent. Consequently, if lamination is performed when the fiber angle is 0–10°, the fibers may break or buckle when the preformer is pressed and bent to fit the cavity of the steering wheel mold, with the result that the strength of the steering wheel deteriorates.

The tube to be placed under internal pressure should comprise a material which can withstand the temperature and pressure required for curing a fiber-reinforced prepreg such as carbon fiber, e.g. 80–180° C. For example, a nylon tube or silicone tube may be used.

This tube may be placed under internal pressure by filling it with an alcohol, and then vaporizing the alcohol. The alcohol used to fill the tube is vaporized by the heat required to cure the prepreg. As the internal pressure of the tube is increased when the prepreg is pressed into the mold and cured, a product having a good surface free of voids is obtained. For this purpose, a nylon tube may be used and filled with ethyl alcohol.

As the material of the core on which the fiber-reinforced prepregs are laminated, a lightweight foam may be used. The lightweight foam may be injected into a mold having the shape remaining after subtracting the thickness of the fiber-reinforced synthetic resin of a rim of a steering wheel, and hardened to obtain the core.

The material used to obtain the core of lightweight foam should be able to withstand the temperature and pressure required to cure the fiber-reinforced prepregs. Examples are heat-resistant hard urethane foam, vinylidene chloride foam, hard acryl foam, polymethacrylimide hard foam (Rohacell), or a synthetic foam comprising phenol or glass microballoons cured by a resin.

When a counterweight is disposed inside the rim to improve balance, a mandrel having a depression or constriction at a position in which the counterweight is to be disposed, is covered by the tube to be placed under internal pressure, and fiber-reinforced prepregs are laminated on the tube. After disposing the counterweight on the outer surface and laminating more turns of fiber-reinforced prepregs so as to form a rim preformer, the preformer is shaped to make the steering wheel.

The material used for the counterweight may be a metal plate of high specific gravity, e.g. a lead plate. Alternatively a metal powder, e.g. tungsten, may be kneaded together with a resin and molded into a sheet in the semi-hard state(B-stage). In this case, if a resin is used having the same composition as that of the fiber-reinforced prepreg of carbon fiber, it can be formed in a one-piece construction with the prepreg. Metal fiber braid or fabric prepregs such as those made of stainless steel, iron or copper are also useful as counterweights. In this case, they are formed in a one-piece construction with the resin of the carbon fiber prepreg, and as the metal fiber functions as a further reinforcement, they confer the advantage of higher strength.

A "structural reaction injection molding method" may also be used to manufacture the steering wheel. An invention according to this structural reaction injection method comprises:

a step for covering a mandrel having an external diameter corresponding to the internal diameter of a rim, by a tube to be placed under internal pressure, a step for covering the mandrel covered by this tube with reinforcing fiber braids and then removing the braid from the mandrel together with the tube so as to obtain a preformer, a step for pressing and bending the preformer into a cavity of a mold corresponding to a rim of a steering wheel, a step for setting a metal skeleton comprising a center boss and spokes in a one-piece construction, into the steering wheel mold, a step for joining link portions at the ends of the spokes of the skeleton to the preformer by reinforcing fiber braids, and a step for clamping the steering wheel mold, placing the mold under a vacuum, injecting a liquid resin into the mold while placing the tube under an internal pressure, and curing the resin so as to form the steering wheel.

Another invention relating to a structural reaction method injection comprises:

a step for injecting an alcohol into a tube having an external diameter corresponding to the internal diameter of a rim, and sealing the open end of said tube, a step for covering this tube by reinforcing fiber braids so as to obtain a preformer, a step for pressing and bending the preformer into a cavity of a mold corresponding to a rim of a steering wheel, a step for setting a metal skeleton comprising a center boss and spokes in a one-piece construction, into this steering wheel mold, a step for joining link portions at the ends of the spokes of the skeleton to the preformer by reinforcing fiber braids, a step for clamping the steering wheel mold, placing the mold under a vacuum, injecting a liquid resin into the mold while placing the tube under an internal pressure, and curing the resin so as to form the steering wheel, and a step for forming a small hole in the rim of this steering wheel, and heating the rim above the boiling point of the alcohol so as to remove the alcohol.

A yet another invention according to the structural reaction injection method comprises:

a step for injecting a lightweight foam into a mold having the shape remaining after subtracting the thickness of a fiber-reinforced resin of a rim of a steering wheel, and hardening it so as to obtain a core, a step for laminating reinforcing fiber braids on this core so as to obtain a rim preformer, a step for pressing the preformer into a cavity of a mold corresponding to a rim of a steering wheel, a step for setting a metal skeleton comprising a center boss and spokes in a one-piece construction, into the steering wheel mold, a step for joining link portions at the ends of the spokes of the skeleton to the preformer by reinforcing fiber braids, and a step for clamping the steering wheel mold, placing the mold under a vacuum, and injecting a liquid resin into the mold so as to form the steering wheel.

These inventions also provide a steering wheel which is lightweight, has adequate strength and shock absorption capacity, and a method of manufacturing this steering wheel easily.

In this structural reaction injection method, the preformer covered by reinforcing fiber braids are disposed in a cavity of a steering wheel mold, the mold is clamped, the cavity is placed under vacuum, the vacuum path is then closed and a liquid resin is injected into the cavity. The liquid resin is then cured while being pressurized with an internal pressure applied to the tube or a pressure generated by the vaporization of an alcohol filled in the tube.

In particular, when an internal pressure is applied, the pressurized state is maintained until at least after the liquid resin is injected and the resin is curing. Any bubbles in the resin are therefore made smaller. Alternatively, volatile components of solvents are redissolved in the liquid resin so as to eliminate voids.

When a lightweight foam is used as the core, pressurization is continued from the side on which the liquid resin is injected until the resin has cured.

As in the case of the aforesaid fiber-reinforced prepreg, the synthetic resin comprising the rim of the steering wheel may be an epoxy resin, vinyl ester resin, unsaturated polyester resin, bismaleimide resin, polyimide resin, or a crosslinked polyester amide (CP resin). The fiber used to reinforce this resin may be carbon fiber, glass fiber, aramid fiber, ultra high molecular weight polyethylene fiber or high strength polyarylate fiber, as stated hereabove.

This invention relates to a steering wheel comprising a rim formed from a fiber-reinforced synthetic resin, a metal center boss, and metal spokes joining the rim to the boss. By forming the rim of fiber-reinforced synthetic resin, a much more lightweight steering wheel is obtained which has excellent shock resistance due to metal spokes.

According to the invention relating to a manufacturing method, a fiber-reinforced prepreg is wound on a mandrel or a core, a rim is formed by using a steering wheel mold, and a steering wheel is fabricated by joining the rim to a metal skeleton. A steering wheel having a fiber-reinforced synthetic resin rim which is firmly joined to metal spokes may therefore be efficiently manufactured.

In the invention relating to a manufacturing method using structural reaction injection molding, a mandrel or a lightweight foam core covered by a pressurizing tube is laminated by reinforcing fiber braid, a synthetic resin rim reinforced by the fiber braid is formed by using a steering wheel mold, and a steering wheel is manufactured by joining the rim to a metal skeleton. A steering wheel having a fiber-reinforced synthetic resin rim firmly joined to metal spokes may thus be manufactured more efficiently than by the method using a fiber reinforced prepreg.

The above and other objects, features and advantages of this invention will be apparent from the following description of illustrative embodiments, which are to be read in connection with accompanying drawings.

DETAILED DESCRIPTION OF THE PREFERRED EMBODIMENTS

This invention will now be described in more detail by the preferred embodiments with reference to the drawings.

Embodiment 1

Figure 1:
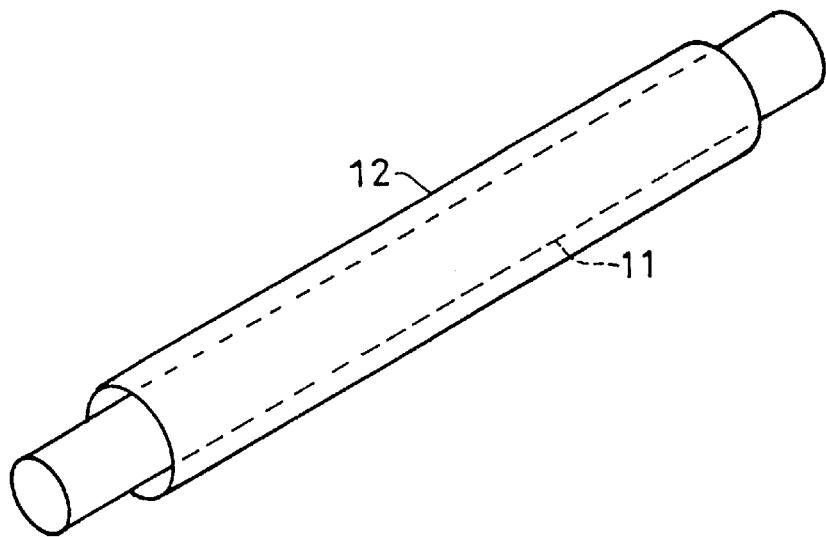
FIG. 1 is a perspective view of a mandrel covered by a pressurizing tube.

FIG. 1 shows a mandrel 11 used to form a steering wheel according to the first embodiment. The mandrel 11 has a columnar shape, and its outer circumference is covered by a nylon tube 12 for applying an internal pressure.

Figure 2:
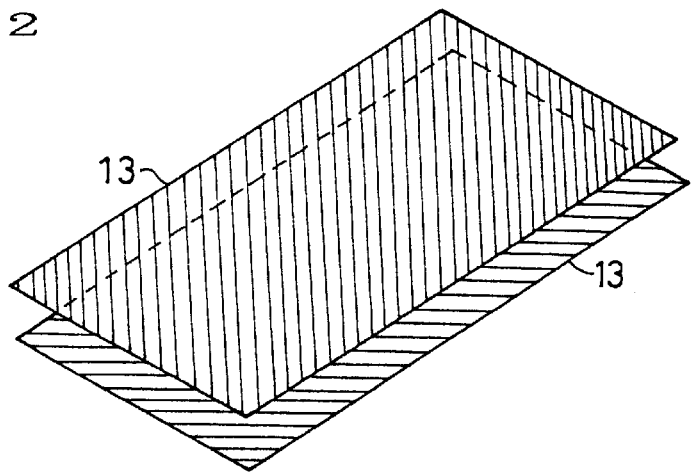
FIG. 2 is a perspective view of carbon fiber prepregs laminated on a mandrel.
Figure 3:
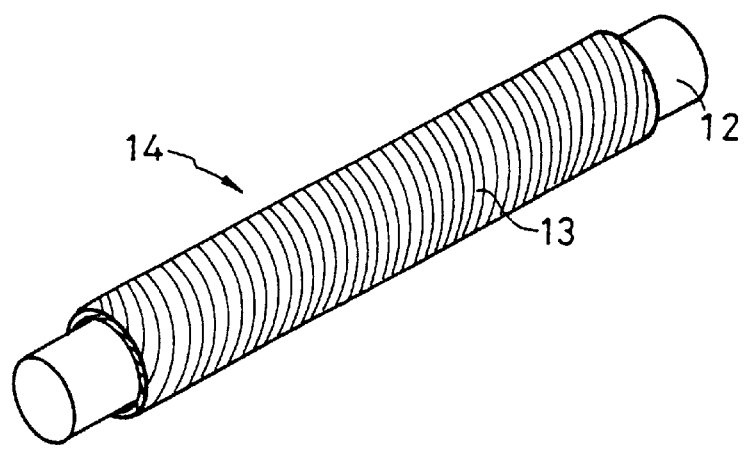
FIG. 3 is a perspective view of a preformer.

FIG. 2 shows a prepreg sheet 13 prepared by arranging carbon fibers (Toho Rayon Co., Besfight) in one direction. This prepreg sheet 13 is formed from a precut sheet cut so that the carbon fibers are at an angle of ±45° relative to the axis of the mandrel 11. These carbon fiber prepregs 13 are wound by the usual method for a plurality of times over the mandrel 11 covered by the tube 12 using, for example, a rolling table. After lamination, it is withdrawn together with the tube 12 from the mandrel 11 so as to obtain a linear preformer 14 as shown in FIG. 3.

Figure 4:
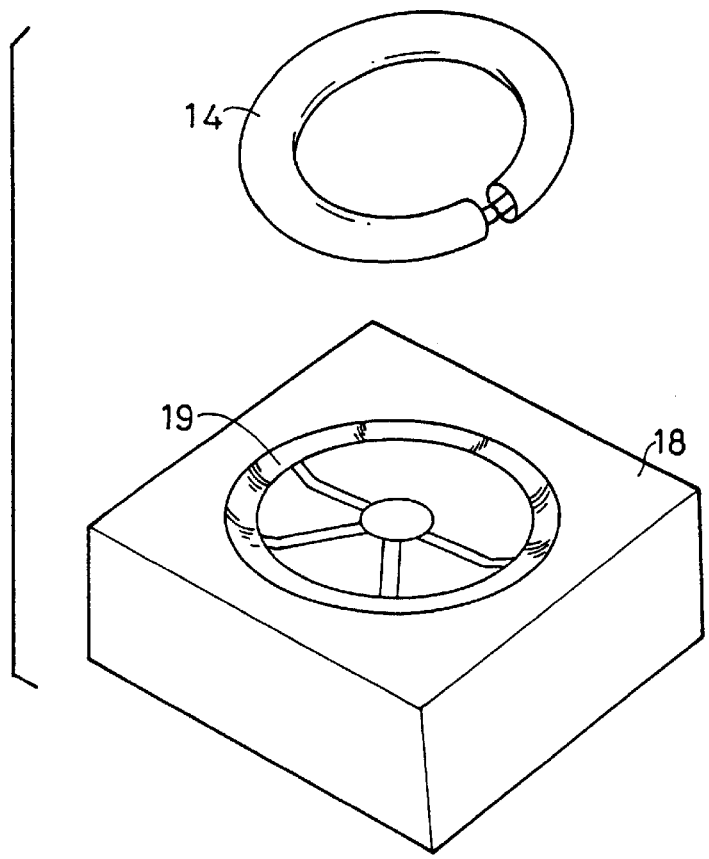
FIG. 4 is a perspective view showing the operation of pressing a preformer into a cavity of a mold.

As the prepreg 13 in this preformer 14 is still not cured, it can easily be bent manually, and is pressed into a shape that fits into a cavity 19 of a steering wheel mold 18 as shown in FIG. 4.

Figure 5:
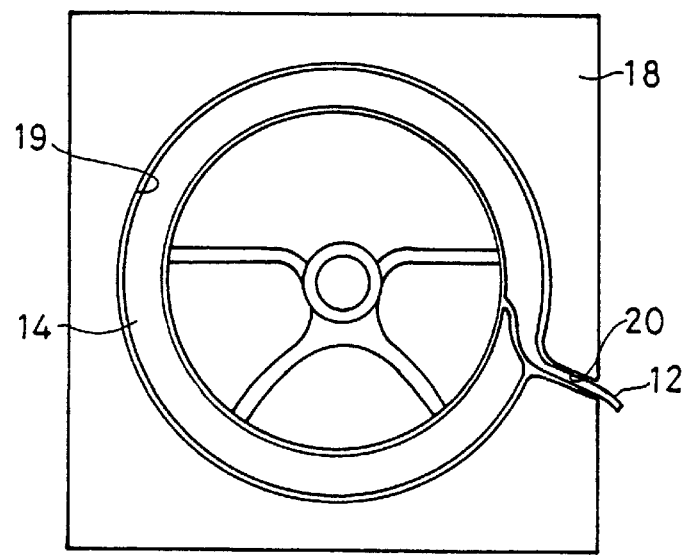
FIG. 5 is a plan view of a mold into which a preformer is pressed.

One end of the tube 12 of the preformer 14 pressed into the steering wheel mold 18 is then sealed by heat sealing, and the other end is pulled outside through an air supply port 20 formed in the steering wheel mold 18, as shown in FIG. 5. Compressed air to pressurize the tube 12 is supplied through this projecting part of the tube.

A metal skeleton 23 is formed from a center boss 24 and spokes 25 extending radially from the boss, link pieces 26 at the ends of the spokes being provided at the contact points with the rim. The center boss 24 is made from structural rolled steel. The boss 24 is cast in one piece together with the spokes 25 which are formed of a magnesium alloy. Attachments 27 such as for an airbag system, horn and cover are simultaneously formed with the spokes when they are cast. The link pieces 26 which are formed in a one-piece construction with the ends of the spokes 25 have a T shape, the horizontal bars of the "T" being embedded in the inner wall of the rim as shown in FIG. 7.

Figure 7:
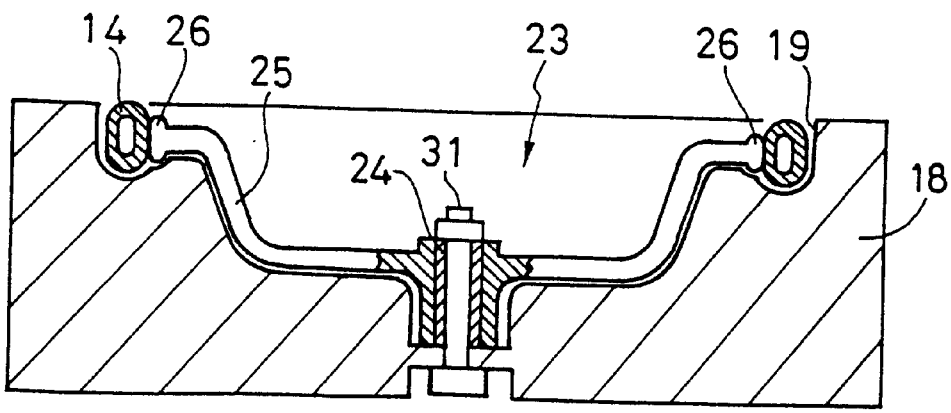
FIG. 7 is a vertical view in section of a mold in which a metal skeleton is set.

As shown in FIG. 7, the metal skeleton 23 is set in the steering wheel mold 18. A locating pin 31 is set in the center of the mold 18. This pin 31 is inserted in a fixing hole in the steering shaft, and as the skeleton 23 is thereby fixed in the mold 18, the relative position of the rim and skeleton 23 does not shift. Further, the link pieces 26 of the skeleton 23 are embedded in the rim in its cross-sectional direction as shown in FIG. 7, the preformer 14 being deformed into a non-circular section. The preformer 14 is then set in the mold 18 together with the link pieces 26 of the spokes 25.

Figure 8:
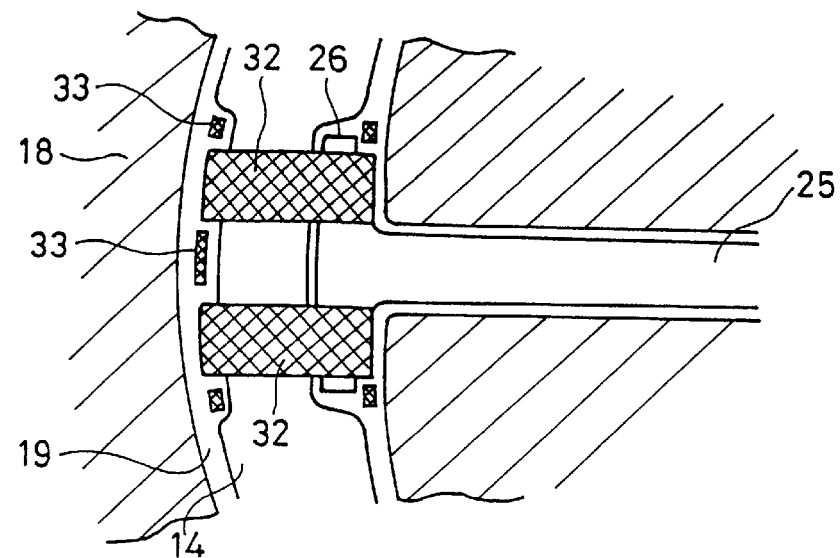
FIG. 8 is a horizontal view in section of the essential parts of a mold showing a join between a link piece of a spoke of a metal skeleton and a preformer.

FIG. 8 shows how the link pieces 26 of the skeleton 23 are bound to the preformer 14. Connecting bands 32, comprising five layers of carbon fiber cloth prepreg of width approx. 15 mm, are used to bind the preformer 14 and the horizontal bars of the "T"-shaped link pieces 26 together. The gap with the cavity 19 of the steering wheel mold 18 which is left is filled with an epoxy resin sheet 33 (Ciba-Geigy, Redax 214), and the wheel is finished by covering it with a carbon fiber cloth prepreg.

Figure 9:
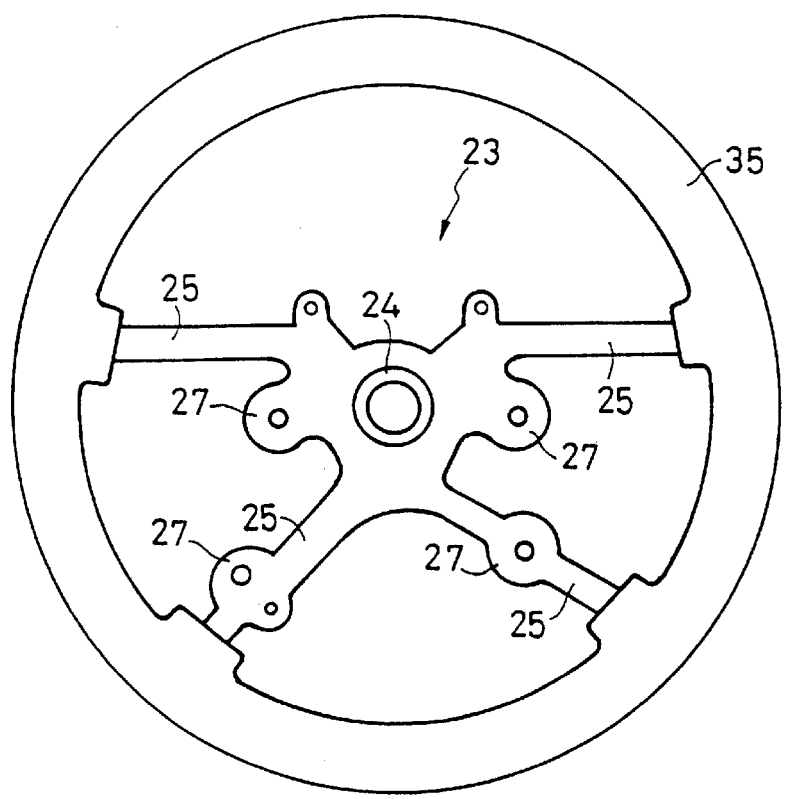
FIG. 9 is a plan view of the steering wheel obtained.

After the skeleton 23 is bound to the rim preformer 14, the mold 18 is clamped, and heated while the tube 12 is pressurized via an air supply port 20 using compressed air at 4 kg/cm2 so as to cure the carbon fiber prepregs. A steering wheel shown in FIG. 9 is thereby obtained. The molding temperatures were 80° C. for 30 minutes followed by 130° C. for 2 hours. The weight of the steering wheel was approx. 700 g.

In the steering wheel according to this embodiment, the rim is formed of hollow carbon fiber synthetic resin surrounding the hollow tube 12. The rim 35 is joined to the center boss 24 by magnesium alloy spokes 25, and as the spokes 25 are firmly fixed to the rim 35, the wheel is lightweight and strong. Moreover, when impact force is applied on the steering wheel, the magnesium alloy spokes 25 deform plastically and they absorb shock energy, and a steering wheel with excellent shock resistance is obtained.

As most of the weight of the steering wheel is concentrated in the magnesium alloy skeleton 23, it has a low moment of inertia even when an airbag system is mounted inside the rim, is easy to control and has a "sporty" feel to it. Further, as the attachments 27 for the airbag system are formed when the skeleton 23 is cast, it has the advantage of requiring very little final machining such as drilling holes or the like.

Embodiment 2

In a method similar to that of the aforesaid first embodiment, the unidirectional carbon fiber prepregs 13 are laminated on the pressurizing tube 12, and then a further carbon fiber cloth prepreg is laminated on the unidirectional prepregs 13 such that the fibers are oriented at ±45° with respect to the axial direction. The preformer 14 thus obtained is joined to the aluminum alloy skeleton 23.

Figure 10:
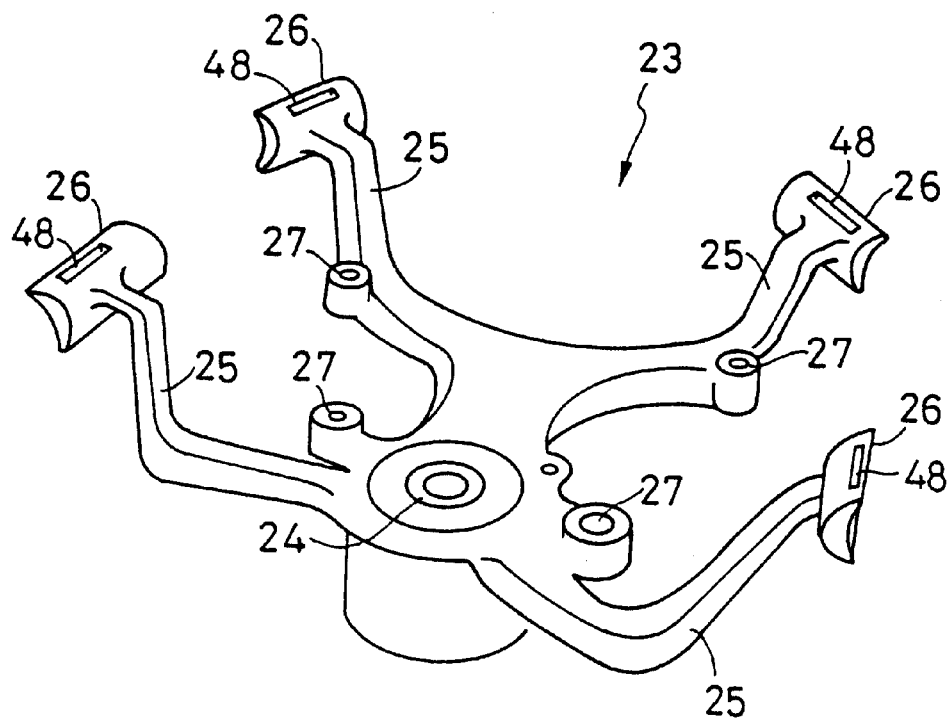
FIG. 10 is an external perspective view of a metal skeleton.

As seen from FIG. 10, the skeleton 23 comprises the center boss 24 and spokes 25 which extend radially. The link pieces 26 are formed in a one-piece construction at the ends of the spokes 25 where they intersect with the rim. The center boss 24 is formed from structural cold-rolled steel, the boss 24 being cast in the center of the aluminum alloy spokes 25 so that it is joined to them.

The fittings 27, such as for an airbag system, horn or cover, are simultaneously formed in the spokes 25 of the skeleton 23 when they are cast. The link pieces 26 formed in a one-piece construction at the ends of the spokes 25 have a "T" shape, and are provided with slits 48 for inserting a prepag for binding. The cross-sectional shape of the T-shaped link pieces 26 is a crescent moon, the outer arc-shaped depression follwing the outer spherical surface of the preformer 14.

Figure 11:
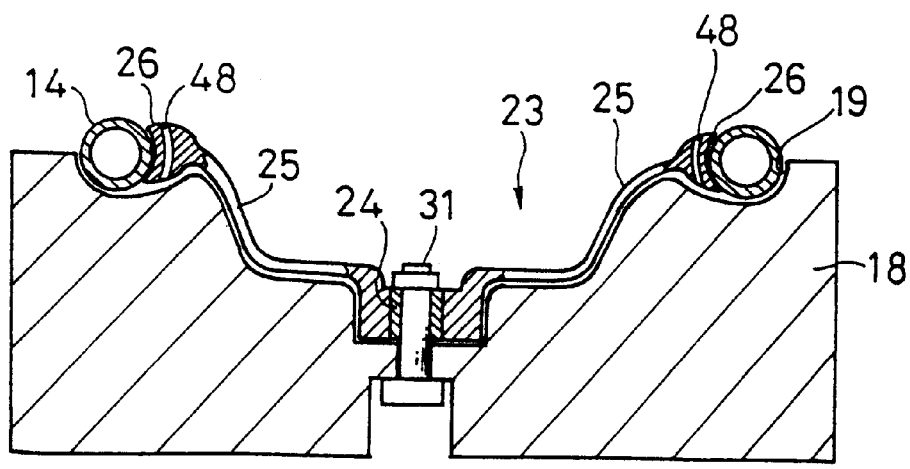
FIG. 11 is a vertical view in section of a mold in which a metal skeleton is set.

The metal skeleton 23 is set in the mold 18 as shown in FIG. 11. The mold 18 has a locating pin 31 implanted in its center. This locating pin 31 is inserted in a fixing hole on the steering shaft of the center boss 24, and the skeleton 23 is thereby fixed so that it is located in the mold 18. This prevents any shift in the relative positions of the rim and skeleton 23. The link pieces 26 of the skeleton 23 are so arranged that the horizontal bars of the "T" are in contact with the rim, the preformer 14 being set in the mold 18 together with the link pieces 26 in contact with the outer surfaces of these horizontal bars.

Figure 12:
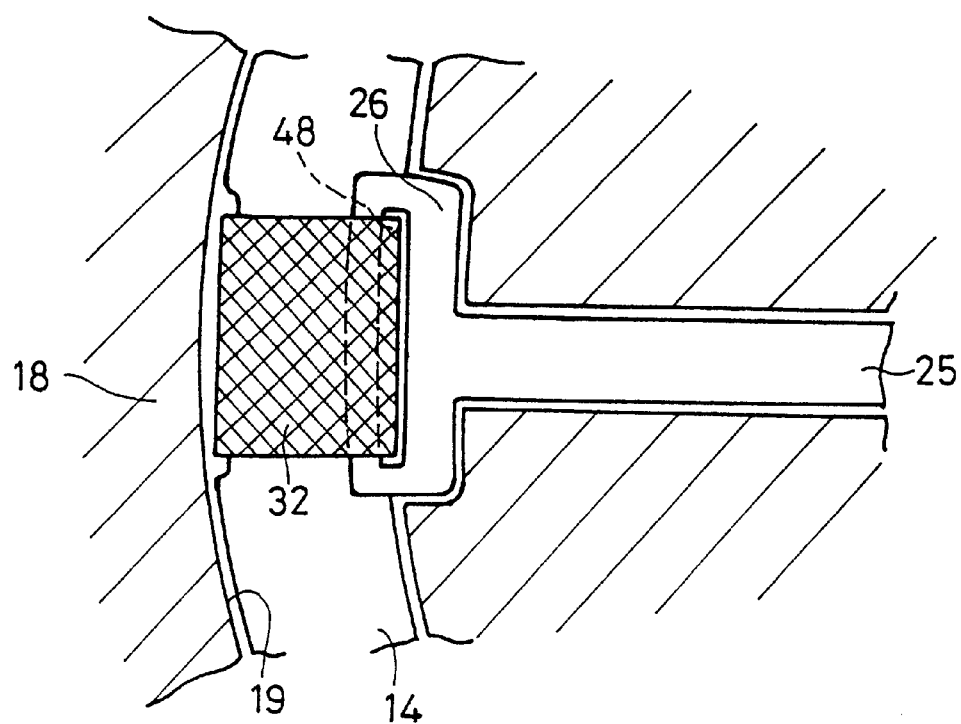
FIG. 12 is a horizontal view in section of a mold showing a join between a link piece of a spoke of a metal skeleton and a preformer.

The link pieces 26 at the ends of the spokes 25 of the skeleton 23 are joined to the preformer 14 as shown in FIG. 12. The connecting bands 32 comprising five layers of laminated carbon fiber cloth prepreg of width 30 mm are inserted in the slits 48 provided in the link pieces 26, and are wound around the preformer 14 so that the link pieces 26 and the preformer 14 are bound together. In this case, almost no gap is left with the cavity 19 of the mold 18, so there is no need to use foam resin sheeting.

Figure 13:
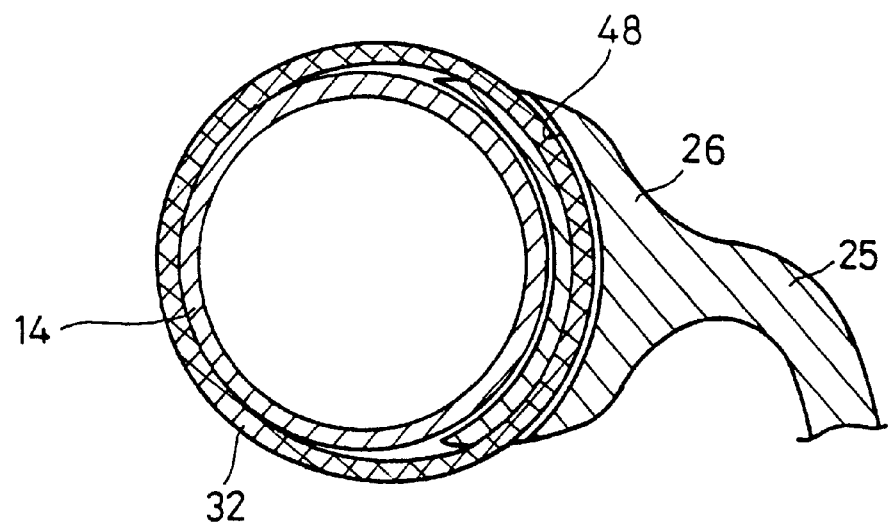
FIG. 13 is view in vertical section showing a join between a link piece of a spoke and a preformer.

FIG. 13 shows the join between the link piece 26 and the preformer 14 in cross-section. It is clear that the link piece 26 and the preformer 14 in contact with the outer surface are firmly bound together by the connecting band 32 inserted in the slit 48 of the link piece 26.

A steering wheel was obtained by disposing the skeleton 23 and preformer 14 in the mold 18, binding them together by the connecting bands 32, and curing and heating under the same conditions as those of the first embodiment. The weight of this steering wheel was approx. 750 g.

As in the case of the first embodiment, the steering wheel thus obtained was lightweight, and had adequate mechanical strength and shock resistance. Moreover the unique texture of the carbon fiber cloth appears on the outer surface so that a steering wheel of high commercial value is obtained.

Embodiment 3

As in the case of the aforesaid first embodiment, the mandrel 11 shown in FIG. 1 was covered by a nylon tube 12 for applying internal pressure, and the carbon fiber prepregs 13 shown in FIG. 2 were wound around it using a rolling table such that the fibers were at ±45° relative to the axis of the mandrel 11. After lamination, the prepreg was removed from the mandrel 11 together with the tube 12 so as to obtain the preformer 14 shown in FIG. 3.

10 g of ethyl alcohol was injected into the tube 12 of the preformer 14, and the open ends of the tube 12 were heat sealed with the tube 12 slightly inflated so as to seal in the ethyl alcohol.

A steering wheel was obtained by using this preformer 14 to form a rim by the same method as that of the aforesaid first embodiment, and assembling it with a magnesium alloy skeleton 23. A small hole of diameter 2 mm was formed in the rim of this steering wheel, and the wheel was dried at 100° C. for 1 hour so that the ethyl alcohol sealed in the tube 12 was heated above its boiling point and removed. The weight of the steering wheel thus obtained was approx. 700 g.

Therefore by first sealing alcohol in the tube 12 laminated with the prepreg 13, and using the heat required to cure the resin to vaporize the alcohol and increase the pressure in the tube 12, curing takes place with the prepreg 13 pressed against the internal surface of the cavity of the mold 18, and a steering wheel with a good surface free of voids is thus obtained.

Embodiment 4

A steering wheel was formed using an aluminum alloy skeleton 23 by the same method as that of the aforesaid third embodiment. The steering wheel thus obtained had a weight of approx. 750 g. As in the case of the first embodiment, the steering wheel thus obtained was lightweight, and had adequate mechanical strength and shock resistance. Moreover the unique texture of the carbon fiber cloth appears on the outer surface so that a steering wheel of high commercial value is obtained.

Embodiment 5

Figure 14:
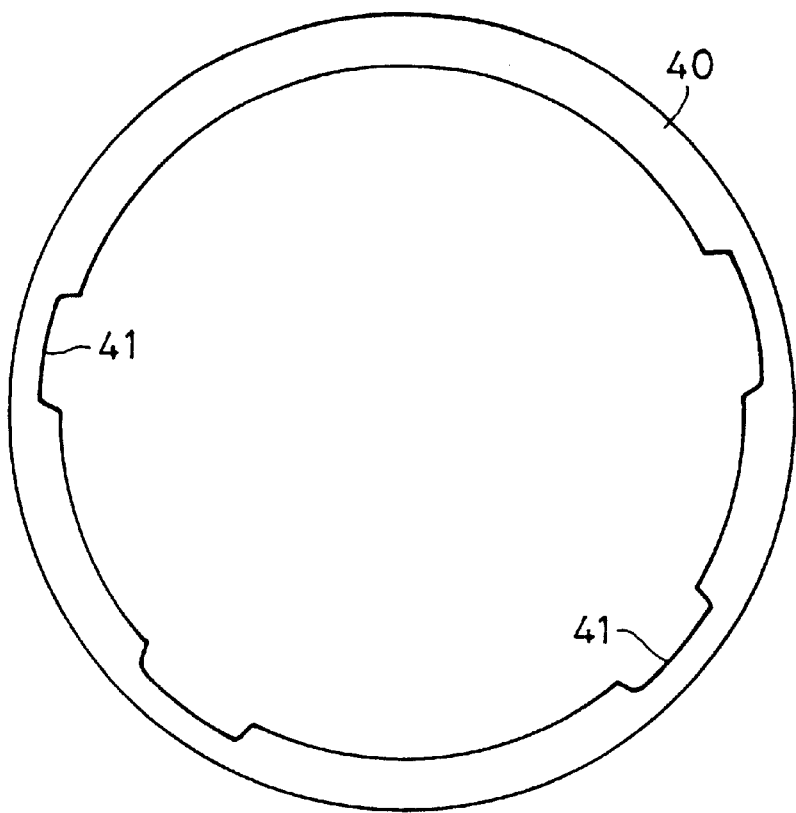
FIG. 14 is a plan view of a lightweight foam core.

This embodiment utilizes a lightweight foam core to form the steering wheel. FIG. 14 shows a lightweight core 40 used to form a steering wheel according to this embodiment. This core 4 has the shape remaining after subtracting the thickness of the carbon fiber synthetic resin layer from the rim, and it has depressions 41 for the link pieces 26 in parts where the link pieces 26 of the spokes 25 are joined to it.

Figure 15:
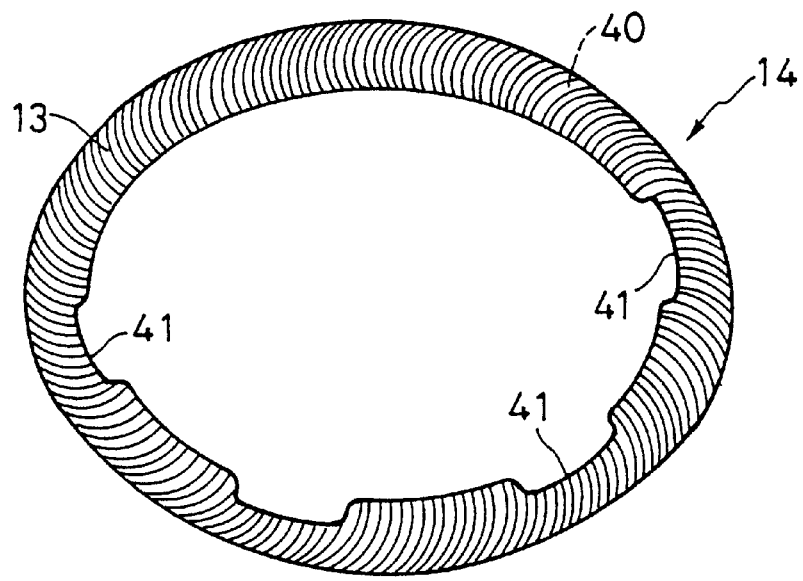
FIG. 15 is a perspective view of a lightweight foam core laminated by a carbon fiber reinforced prepreg.

This type of lightweight core may for example be obtained by mixing and stirring hard urethane liquid Actocol RI-31R and Takenate IS-01IP (Takeda Pharmaceutical Co.) together, injecting the mixture in a mold and curing. For example according to this embodiment, the lightweight foam core 40 of bulk specific gravity 0.15 is used. First, one layer of the prepreg 13 having carbon fibers (Toho Rayon Co., Besfight) aligned in one direction is laminated at 90° with respect to the center line of the rim cross-section, then two layers are laminated at ±45° so as to obtain the preformer 14 shown in FIG. 15.

A steering wheel was obtained from this preformer 14 by forming a rim of carbon fiber reinforced resin, using the mold 18 and joining it to the magnesium alloy skeleton 23, in the same way as in the first embodiment. The weight of this steering wheel was approx. 800 g. According to this embodiment, the rim of the steering wheel comprises the lightweight foam core 40 and carbon fiber-reinforced resin forming the outer sheath, and the rim is joined to the center boss 24 by the magnesium alloy spokes 25.

In this steering wheel also, the spokes and rim are fixed firmly together, so the wheel is lightweight and strong. When impact force is applied on the steering wheel, the spokes of the magnesium alloy deforms plastically, it absorbs shock energy, and a steering wheel having excellent shock resistance is thereby obtained.

Embodiment 6

Polyvinyl chloride foam (Asahi Kasei Kogyo Co., Cellmore filler) was used as starting material to obtain a core of bulk specific gravity 0.06. Unidirectional prepregs were laminated as in the fifth embodiment using this core, and joined to the magnesium alloy skeleton 23 under the same conditions as those of the fifth embodiment so as to obtain a steering wheel. The weight of this wheel was approx. 750 g.

Embodiment 7

Figure 16:
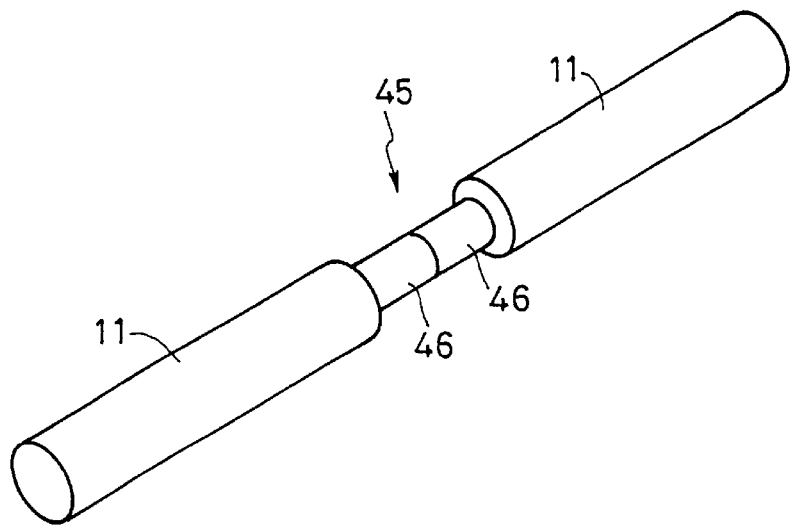
FIG. 16 is a perspective view of a mandrel.
Figure 17:
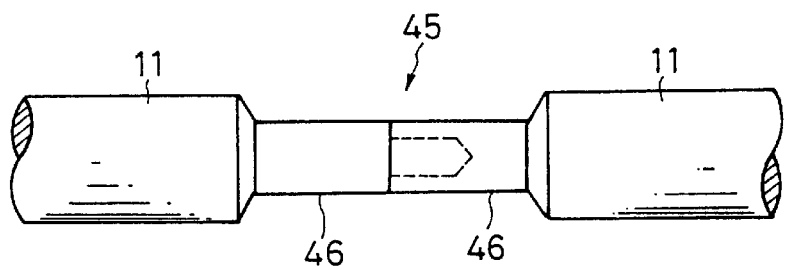
FIG. 17 is a front view of the essential parts of a mandrel.

This embodiment relates to a steering wheel wherein a counterweight was disposed in the rim. FIG. 16 and FIG. 17 show mandrels 11 with a connection 45 used to form the steering wheel. A constriction 46 was provided in a position where the counterweight was disposed, the mandrels 11 being joined by a screw at the constrictions 46 so that they can be separated.

Figure 18:
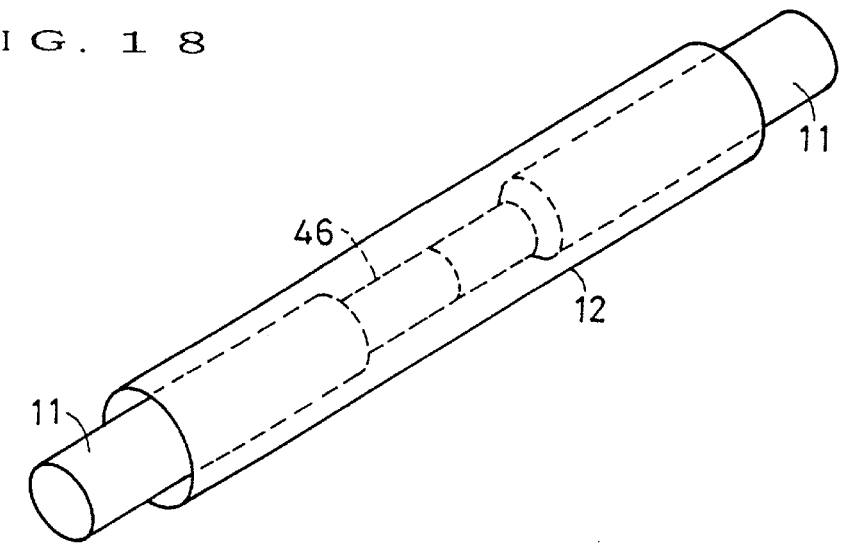
FIG. 18 is an external perspective view of a mandrel covered by a pressurizing tube.
Figure 19:
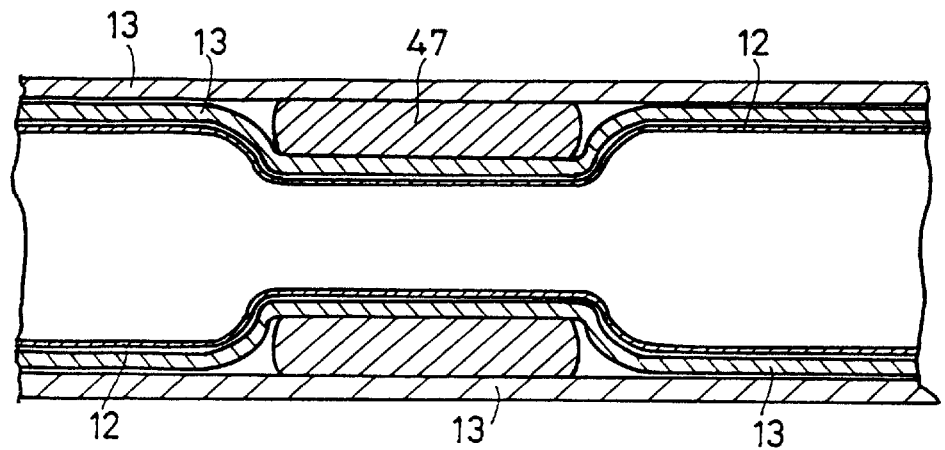
FIG. 19 is an enlarged cross sectional view of the essential parts of a preformer showing how a counterweight is fitted.

After covering the mandrel 11 by the tube 12 shown in FIG. 18, the precut sheet 13, cut so that the unidirectionally aligned carbon fibers (Toho Rayon Co., Besfight) were oriented at ±45° with respect to the axis of the mandrels 11, were laminated on the tube 12 as shown in FIG. 19.

The counterweight 47 comprising a lead plate of weight 150 g was then disposed in the constriction 46. As the prepreg 13 was not yet cured, the prepreg 13 in that part was pushed into the constriction 46 when the counterweight 47 was positioned. The counterweight 47 does not become an obstacle when the carbon fiber prepreg 13 is further laminated to form an outer layer. Namely after the counterweight 47 was positioned, the carbon fiber prepreg 13 was cut so that the fibers were oriented at ±45° with respect to the axis of the mandrel 11, and was laminated on the mandrel 11. After lamination, one of the pair of mandrels 11 was rotated so as to loosen the screw at the join, and the mandrels 11 were pulled out from the laminated prepreg 13 so as to obtain the preformer 14.

Figure 20:
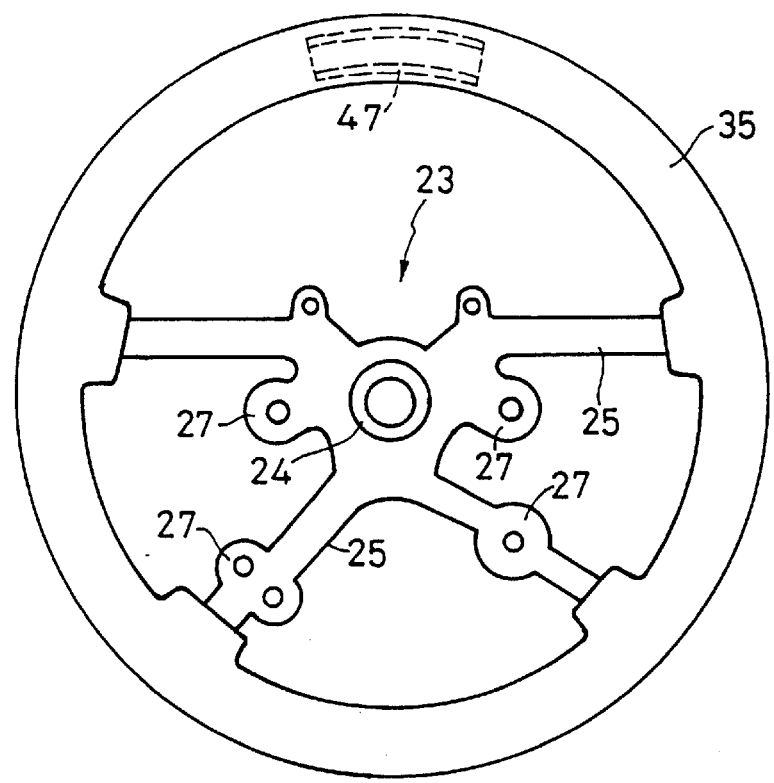
FIG. 20 is a plan view of a steering wheel comprising a counterweight disposed inside it.

A steering wheel shown in FIG. 20 was obtained from this preformer 14 by forming a rim using a similar method to that of the aforesaid first embodiment, and joining it to the magnesium alloy skeleton 23.

In this steering wheel, the counterweight 47 is disposed at a predetermined position on the circumference of the rim, hence even when an airbag system is mounted, the steering wheel has a good balance, is easy to control and has a "sporty" feel to it. This method makes it possible to efficiently manufacture a steering wheel having the counterweight 47.

Embodiment 8

Figure 21:
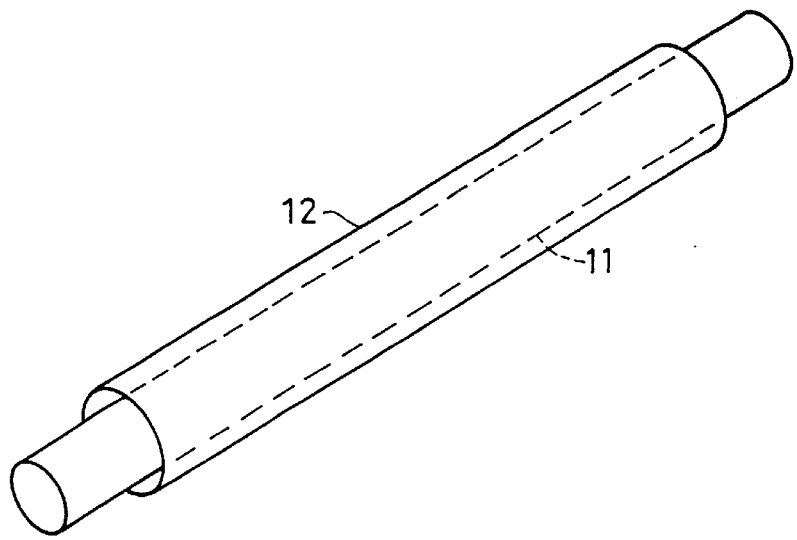
FIG. 21 is a perspective view of a mandrel covered by a pressurizing tube.

FIG. 21 shows the mandrel 11 used to form a steering wheel according to this embodiment. The mandrel 11 has a columnar shape, and its outer circumference is covered by a nylon tube 12 which can be pressurized.

Figure 22:
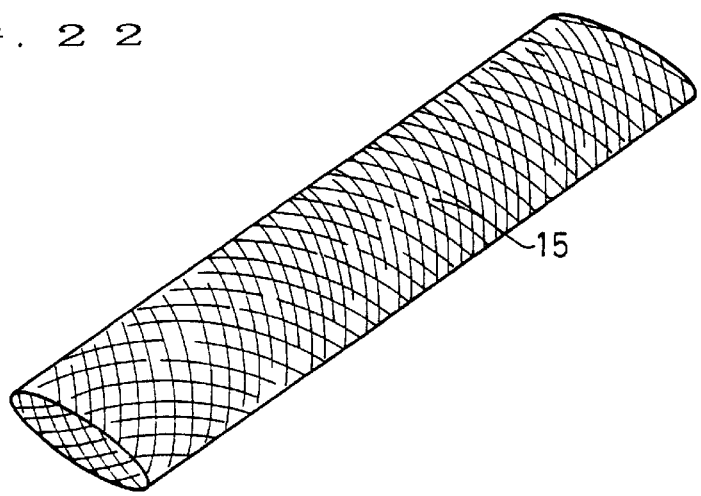
FIG. 22 is a perspective view of a reinforcing carbon fiber braid covering a mandrel.
Figure 23:
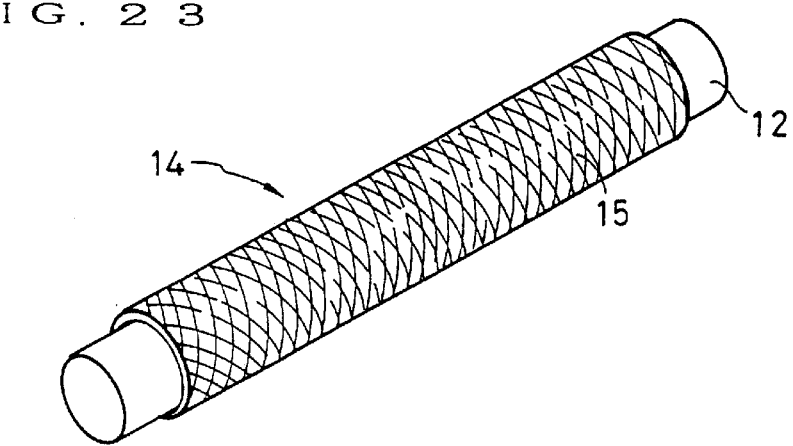
FIG. 23 is a perspective view of a preformer.

FIG. 22 shows a carbon fiber braid 15 (Toho Rayon Co., Besfight, HTA3KX96, outer diameter 30 mm). This braid 15 is woven so that the carbon fibers will be oriented at ±45° with respect to the axis of the mandrel 11 when covered. The braid 15 is laminated over the tube 12 which is already covering the mandrel 11. After covering and laminating, the braid is removed from the mandrel 11 together with the tube so as to obtain a preformer 14 having a linear shape as shown in FIG. 23.

As the braid 15 comprises only carbon fibers, the preformer can easily be bent by hand. The preformer 14 is pressed into a cavity 19 of the mold 18 used in the first embodiment corresponding to the rim of a steering wheel (FIG. 4).

One of the open ends of the tube 12 of the preformer 14 pressed into the mold 18 is heat sealed, and the other free end is taken to the outside through the air supply port 20 formed in the mold 18. Compressed air is then supplied to pressurize the tube 12 through the part of the tube projecting from the port 20.

Figure 6:
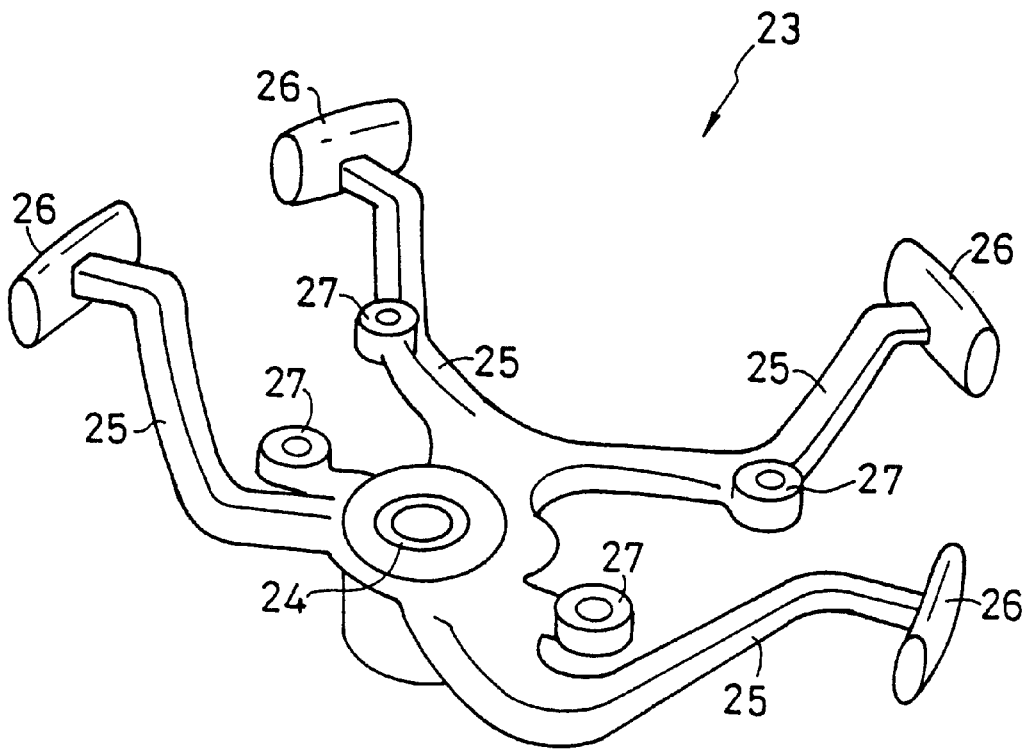
FIG. 6 is a perspective view of a metal skeleton.

The metal skeleton 23 is the same as that used in the first embodiment. It comprises the center boss 24 and spokes 25 extending radially from the boss as shown in FIG. 6, the link pieces 26 being formed at the ends of the spokes 25 where they intersect with the rim. The center boss 24 is formed from structural cold-rolled steel, the boss 24 being joined to the magnesium alloy spokes 25 by casting it in their center. The fittings 27, such as for an airbag system, horn or cover, are simultaneously formed in the spokes 25 when they are cast. The link pieces 26 formed in a one-piece construction at the ends of the spokes 25 have a "T" shape, the horizontal bars of the "T" being embedded in the rim in its cross-sectional direction as shown FIG. 7.

The metal skeleton 23 is set in the mold 18 as shown in FIG. 7. The mold 18 has the locating pin 31 implanted in its center. This locating pin 31 is inserted in a fixing hole on the steering shaft of the center boss 24, and the skeleton 23 is thereby fixed so that it is located in the mold 18. This prevents any shift in the relative positions of the rim and skeleton 23. The link pieces 26 of the skeleton 23 are embedded in the rim, as shown in FIG. 7. In these parts, the preformer 14 is deformed into a non-circular shape in cross section, and set in the mold 18 together with the link pieces 26 of the spokes 25.

The method by which the link pieces 26 are bound to the preformer 14 may essentially be the same as that of the first embodiment. As shown in FIG. 8, the deformed preformer 14 and the horizontal bar of the "T" are bound together by the connecting bands 32 of carbon fiber braid having a given width. According to this embodiment, the foam sheet 33 shown in FIG. 8 may be omitted. An insulating layer of glass fiber braid may first be formed in the link pieces 26. Further, if the parts joined by the bands are covered by pieces of the same carbon fiber braid which have been cut shorter, the joins can be hidden and the external appearance may be improved.

After binding the skeleton 23 and the rim preformer 14, the mold 18 is clamped, the cavity 19 of the mold is placed under vacuum, and a liquid epoxy resin (Dow Chemical, TACTIX138/H31) is injected into the cavity 19 and cured while compressed air is supplied to the pressurizing tube 12 via the air supply port 20 (FIG. 5), thereby obtaining the steering wheel shown in FIG. 9. The air pressure applied to the tube 12 is initially of the order of 0.5 kg/cm², and is increased to 4 kg/cm² after completing injection of the resin so as to expel excess resin outside the mold and reduce voids. The molding temperature used was 80° C. maintained for 30 min. The weight of the steering wheel obtained was approx. 700 g.

Figure 24:
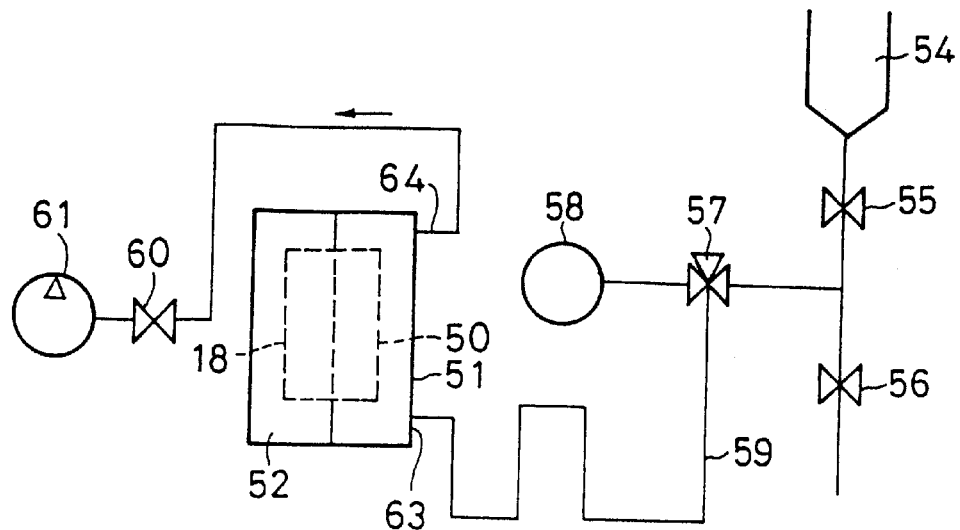
FIG. 24 is a schematic view of a structural reaction injection molding apparatus.

FIG. 24 shows the overall appearance of a molding apparatus using this type of steering wheel mold 18. This apparatus is provided with a hopper 54 for supplying resin. The hopper 54 is connected to a resin supply valve 55, and a resin drain valve 56 is also connected to the resin supply valve 55. Both the resin supply valve 55 and resin drain valve 56 are connected to a three-way valve 57. Another port of the three-way valve 57 is connected to a compressed air source 58.

Figure 25:
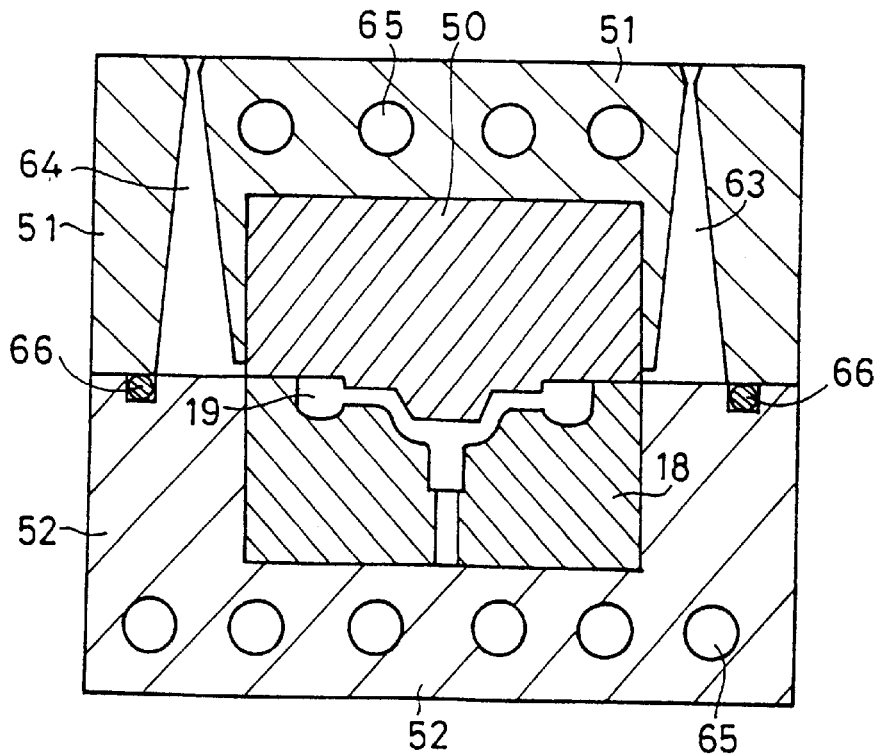
FIG. 25 is a vertical view in section of a mold of a structural reaction injection molding apparatus.

A port provided beneath the three-way valve 57 is connected to a resin compression gas supply line 59, and this line 59 is connected to an inlet 63 of platens 51, 52 respectively comprising an upper mold 50 and a lower mold which is the mold 18 (FIG. 25). An outlet 64 of the platen 51 is connected to a vacuum pump 61 via a discharge valve 60.

The mold 18 is held in the lower platen 52 as shown in FIG. 25, the platen 51 being disposed above the platen 52. The upper mold 50 is held in the platen 51. The inlet 63 and outlet 64 are provided in the platen 51. Heaters 65 are respectively sunk into the platens 51 and 52. An O-ring 66 is disposed in the join surface of the platens 51, 52, this O-ring 66 functioning as a seal.

When a steering wheel rim was molded by using this molding apparatus, the preformer 14 covered by the carbon fiber braid 15 was placed in the cavity 19 of the mold 18, the mold 18 and upper mold 50 were closed, and rotated by 90° such that the inlet 63 was in a lower position and the outlet 64 was in an upper position. The supply line 59 was connected to the inlet 63, and the vacuum pump 61 was connected to the outlet 64 via the discharge valve 60.

The resin supply valve 55 and resin discharge valve 56 were closed, the three-way valve 57 was set to the resin side, the discharge valve 60 was opened and the vacuum pump 61 was operated to reduce the pressure in the cavity 19 of the mold 18. Next, the discharge valve 60 was shut, the supply valve 55 was opened, and resin in the hopper 54 was injected in the molds 18, 5 via the three-way valve 57 and supply line 59.

After injection, the three-way valve 57 was changed over to the compressed air source 58, the pressurizing tube 12 was pressurized, and the resin was cured while maintaining the pressure. Resin remaining in the hopper 54 was discharged by opening the resin discharge valve 56. When curing of the liquid resin was complete, the molds 18, 50 were opened and a cast was removed.

In the steering wheel according to this embodiment, the rim is formed of a fiber-reinforced synthetic resin, and it is connected to the center boss 24 by the magnesium alloy spokes 25. As the spokes 25 and rim are rigidly fixed together, the wheel is not only lightweight but of high strength. Moreover, when the wheel suffers an impact, the magnesium alloy spokes 25 absorb shock energy by undergoing plastic deformation, so the wheel has excellent shock resistance.

As most of the weight of the steering wheel is concentrated in the magnesium alloy skeleton 23, it has a low moment of inertia even when an airbag system is mounted inside the rim, is easy to control and has a "sporty" feel to it. Further, as the attachments 27 of the airbag system are formed when the skeleton 23 is cast, it has the advantage that it requires very little final machining such as drilling holes or the like.

Embodiment 9

As in the case of the aforesaid eighth embodiment, the pressurizing tube 12 was covered by the carbon fiber braid 15, the preformer 14 thus obtained was joined to an aluminum alloy skeleton 23, the assembly was set in the mold 18, and an epoxy resin was injected under the same conditions as those of the eighth embodiment so as to obtain a steering wheel. The weight of the steering wheel was approx. 750 g.

As in the case of the eighth embodiment, the steering wheel thus obtained was lightweight, and had adequate mechanical strength and shock resistance. Moreover the unique texture of the carbon fiber braid appears on the outer surface so that a steering wheel of high commercial value is obtained.

Embodiment 10

Figure 26:
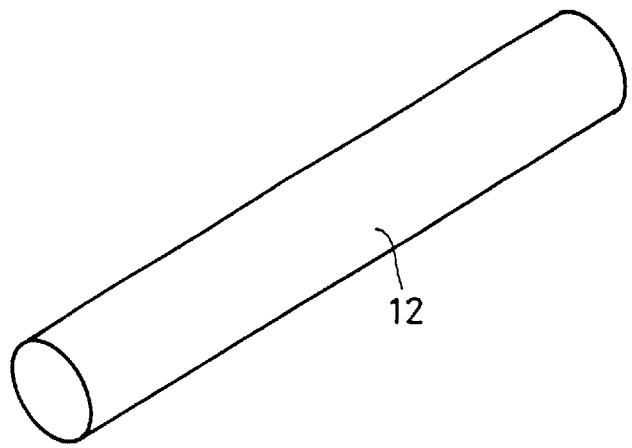
FIG. 26 is an external perspective view of a pressurizing tube.
Figure 27:
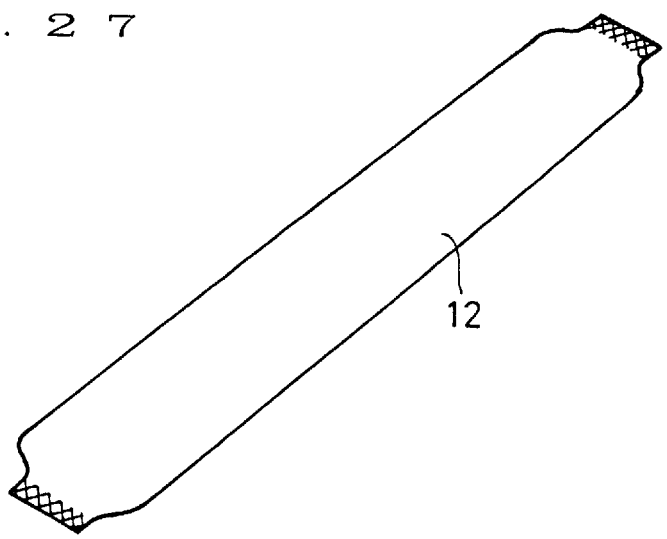
FIG. 27 is a perspective view of a pressurizing tube in which both ends have been sealed after injecting alcohol.
Figure 28:
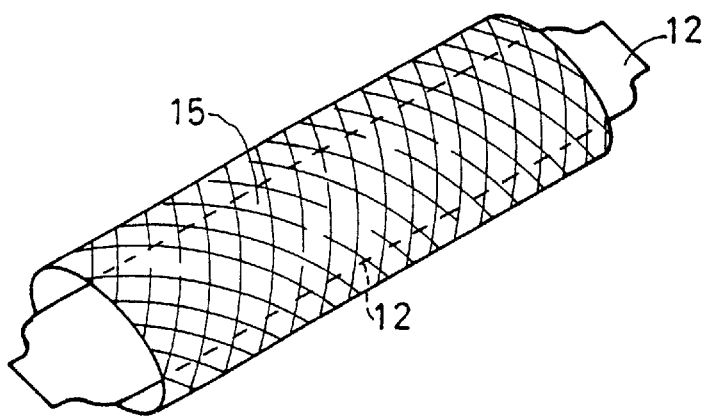
FIG. 28 is an external perspective view of a preformer covered by a carbon fiber braid.

As shown in FIG. 26, into a tube having an outer diameter effectively equal to the inner diameter of a steering wheel rim, e.g. 28 mm, 10 g of ethyl alcohol was injected, and the both open ends of the tube 12 were heat sealed with the tube 12 slightly inflated so as to seal the ethyl alcohol as shown in FIG. 27. This nylon tube was then covered by the same carbon fiber braid 15 as used in the eighth embodiment so as to obtain the preformer 14 shown in FIG. 28.

This preformer 14 was joined to a magnesium alloy skeleton 23, the assembly was set in the mold 18, and a crosslinked polyester amide resin was injected to obtain a steering wheel. The molding conditions were a temperature of 130° C. maintained for 10 min. A small hole of diameter 2 mm was formed in the rim of this steering wheel, and the wheel was dried at 100° C. for 1 hour so that the ethyl alcohol sealed in the tube 12 was heated above its boiling point and removed through the small hole. The weight of the steering wheel thus obtained was approx. 700 g.

Therefore, by first sealing alcohol in the tube 12 laminated with the braid 15, and using the heat required to cure the resin to vaporize the alcohol and increase the pressure in the tube 12, curing takes place with the braid 15 pressed against the internal surface of the cavity 19 of the mold 18, and a steering wheel with a good surface free of voids is obtained.

Embodiment 11

A steering wheel was formed using an aluminum alloy skeleton 23 by the same method as that of the aforesaid tenth embodiment. The steering wheel thus obtained had a weight of approx. 750 g. As in the case of the eighth embodiment, the steering wheel thus obtained was lightweight, and had adequate mechanical strength and shock resistance. Moreover the unique texture of the carbon fiber braid appears on the outer surface so that a steering wheel of high commercial value is obtained.

Embodiment 12

Figure 29:
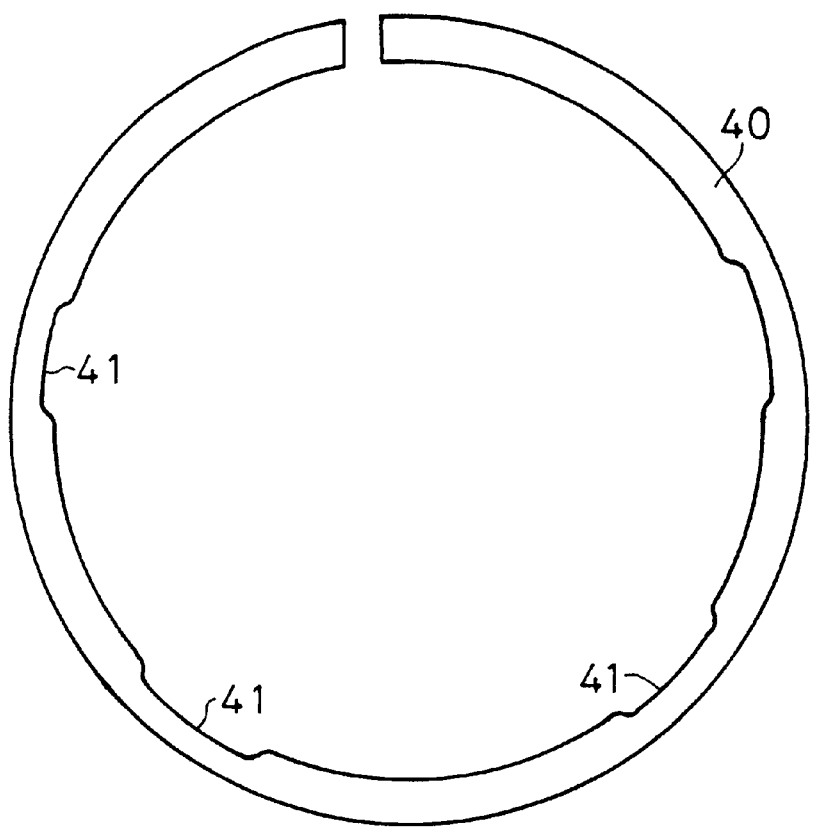
FIG. 29 is a plan view of a lightweight foam core.

This embodiment utilizes a lightweight foam core to form the steering wheel. FIG. 29 shows the lightweight core 40 used to form a steering wheel according to this embodiment.

The core 40 is formed with the shape remaining after subtracting the thickness of the fiber-reinforced resin from the rim, depressions 41 for inserting the link pieces 26 being formed where the link pieces 26 of the spokes 25 are to be joined.

Figure 30:
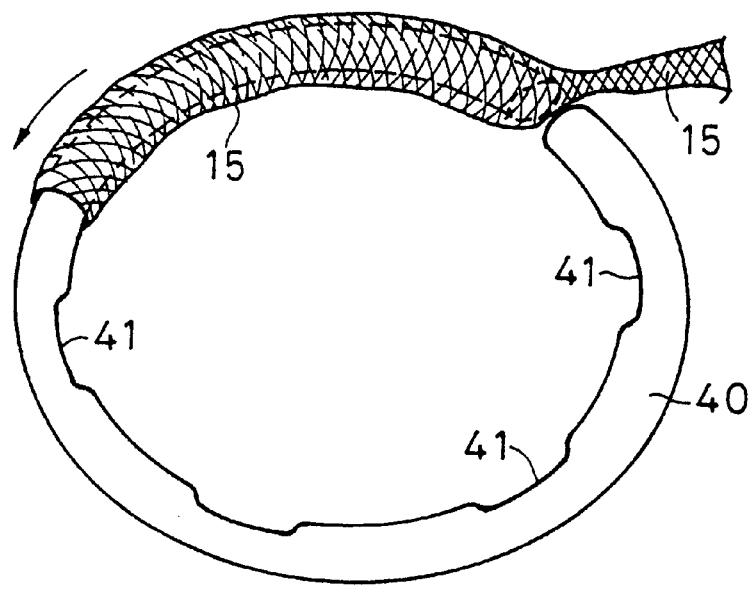
FIG. 30 is a perspective view showing a carbon fiber braid covering a lightweight foam core.
Figure 31:
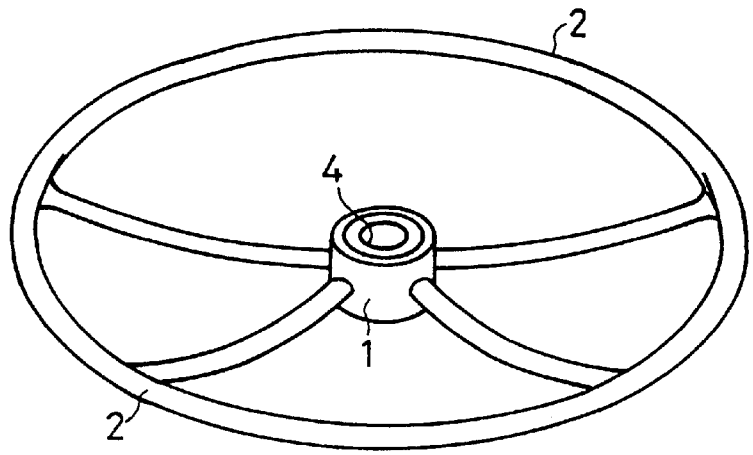
FIG. 31 is a perspective view of a conventional steering wheel skeleton.
Figure 32:
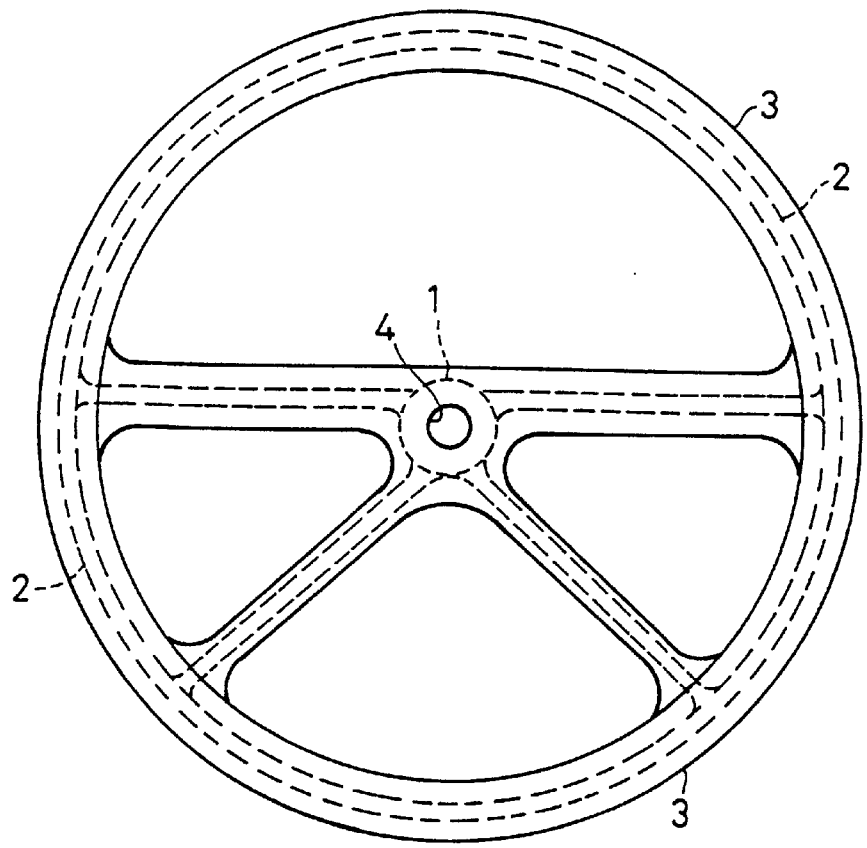
FIG. 32 is a plan view of a conventional steering wheel.

This type of lightweight core may for example be obtained by mixing and stirring hard urethane liquid Actocol RI-31R and Takenate IS-01P (both by Takeda Pharmaceutical Co.) together, injecting the mixture in a mold and curing. For example according to this embodiment, a lightweight foam core 40 of bulk specific gravity 0.15 is used. The carbon fiber braid 15 (Toho Rayon Co., Besfight HTA3Kx96, outer diameter 30 mm) is pulled onto this foam core 40 from a break in the core 40 so as to cover the core 40 as shown FIG. 30, and then the braid 15 is doubled over itself so that there are two layers of braid. In this way, the rim preformer 14 was obtained.

A steering wheel was obtained from this preformer 14 by forming a rim of resin reinforced by carbon fiber braid using the mold 18 in the same way, and joining it to the magnesium alloy skeleton 23 as in the tenth embodiment. The weight of this steering wheel was approx. 800 g. According to this embodiment, the rim of the steering wheel comprises the lightweight foam core 40 and carbon fiber-reinforced resin forming the outer sheath, and the rim is joined to the center boss 24 by the magnesium alloy spokes 25.

In this steering wheel also, the spokes and rim are fixed firmly together, so the wheel is lightweight and strong. When an impact is suffered, the magnesium alloy of the spokes deforms plastically, it absorbs energy, and a steering wheel having excellent shock resistance is thereby obtained.

Embodiment 13

Polyvinyl chloride foam (Asahi Kasei Kogyo Co., Cellmore filler) was used as starting material to obtain a core of bulk specific gravity 0.06. This core was covered by a carbon fiber braid in the same way as in the twelfth embodiment, and joined to the magnesium alloy skeleton 23 under the same conditions as those of the twelfth embodiment so as to obtain a steering wheel. The weight of this wheel was approx. 750 g.

What is claimed:

1. A steering wheel comprising:
   a metal center boss,
   metal spokes extending outwardly from the center boss and having outer ends, said metal spokes including link pieces formed at the outer ends, each link piece extending substantially perpendicularly to the metal spoke and having a curved surface and a curved slit extending between upper and lower sides thereof, and
   a rim joined to the outer ends of the metal spokes, said rim being fabricated from a fiber-reinforced synthetic resin containing reinforcing fibers oriented in a direction to intersect a longitudinal direction of the rim, said curved surface of the link piece corresponding to a surface of the rim.

2. A steering wheel as defined in claim 1, wherein the reinforcing fiber used in the synthetic resin of said rim is carbon fiber, aramid fiber, glass fiber, ultra high molecular weight polyethylene fiber or high strength polyarylate fiber.

3. A steering wheel as defined in claim 1, wherein said spokes comprise an aluminum alloy or magnesium alloy.

4. A steering wheel as defined in claim 1, wherein a counterweight for improving balance is disposed inside said rim.

5. A steering wheel as defined in claim 4, wherein said counterweight comprises a metal plate, a solid comprising a resin cured with a metal powder, or metal fibers.

6. A steering wheel as defined in claim 1, wherein said rim has a curved cylindrical shape with a center hole therein.

7. A steering wheel as defined in claim 1, wherein said reinforcing fibers are formed of a plurality of fiber sheets, reinforcing fibers in one fiber sheet being oriented in a same direction and the reinforcing fibers in adjacent fiber sheets being oriented differently.

8. A steering wheel as defined in claim 7, wherein the reinforcing fibers in two fiber sheets situated adjacent to each other are arranged symmetrically at an angle of ±45° relative to the longitudinal direction of the rim.

9. A steering wheel as defined in claim 1, further comprising connecting bands for wrapping the link pieces and the rim, each connecting band passing through the curved slit.

10. A steering wheel as defined in claim 1, further comprising a counterweight for balancing the rim, said rim including a depression for receiving the counterweight therein.

11. A steering wheel comprising:

a metal center boss, metal spokes extending outwardly from the center boss and having outer ends, said metal spokes including link pieces formed at the outer ends, each link piece extending substantially perpendicularly to the metal spoke to form two horizontal bars, a rim attached to the link pieces and joined to the outer ends of the metal spokes, said rim being fabricated from a fiber-reinforced synthetic resin containing reinforcing fibers oriented in a direction to intersect a longitudinal direction of the rim passing through a central axis thereof, and connecting bands which wrap around both the horizontal bars and the rim to connect the spoke and the rim.

* * * * *